(12) United States Patent
Bourgain et al.

(10) Patent No.: US 8,111,294 B2
(45) Date of Patent: Feb. 7, 2012

(54) HYBRID IMAGE STABILIZATION METHOD AND APPARATUS

(75) Inventors: Stephane Bourgain, Versailles (FR); Bruno Bustin, Le Mesnil Saint Denis (FR); Jerome Fournier, Montigny-le-Bretonneux (FR); Etienne Payot, Voisins-le Bretonneux (FR); Christophe Rannou, Montigny-le-Bretonneux (FR); Jacques Rioland, Eaubonne (FR)

(73) Assignee: Thales (FR)

( * ) Notice: Subject to any disclaimer, the term of this patent is extended or adjusted under 35 U.S.C. 154(b) by 519 days.

(21) Appl. No.: 12/306,862

(22) PCT Filed: Jun. 25, 2007

(86) PCT No.: PCT/EP2007/056294
§ 371 (c)(1),
(2), (4) Date: Dec. 29, 2008

(87) PCT Pub. No.: WO2008/000711
PCT Pub. Date: Jan. 3, 2008

(65) Prior Publication Data
US 2009/0309984 A1  Dec. 17, 2009

(30) Foreign Application Priority Data

Jun. 29, 2006 (FR) ...................... 06 05885

(51) Int. Cl.
*H04N 5/228* (2006.01)
*G06K 9/64* (2006.01)
*G06K 9/46* (2006.01)
*G03B 17/00* (2006.01)
*G03B 39/00* (2006.01)
(52) U.S. Cl. ................ 348/208.99; 348/208.4; 382/278; 382/236; 396/52; 396/55; 396/13

(58) Field of Classification Search .......... 348/208.99–208.16, 208.4; 382/278, 382/236; 396/52, 55, 13
See application file for complete search history.

(56) References Cited

U.S. PATENT DOCUMENTS
5,926,281 A  7/1999  Rioland et al.
(Continued)

FOREIGN PATENT DOCUMENTS
EP  0948197 A2  10/1999
(Continued)

OTHER PUBLICATIONS

Vieville T et al: "Computation of Ego-Motion and Structure From Visual and Inertial Sensors Using the Vertical Cue" Computer Vision, 1993. Proceedings., Fourth International Conference on Berlin, Germany May 11-14, 1993, Los Alamitos, CA, USA, IEEE Computer Soci, pp. 591-598, XP010128566; ISBN: 0-8186-3870-2.
(Continued)

*Primary Examiner* — Lin Ye
*Assistant Examiner* — Marly Camargo
(74) *Attorney, Agent, or Firm* — Lowe Hauptman Ham & Berner, LLP

(57) ABSTRACT

The invention relates to a method of stabilizing the images of a scene, acquired by means of an observation device of an imaging system, comprising the step of digital processing of a stream of successive images. It comprises a step of acquiring gyrometric measurements by means of at least one gyrometric sensor secured to the observation device, of using these gyrometric measurements to determine so-called approximate shifts undergone between successive images, and the image processing step comprising a sub-step of using the approximate shifts and the image stream acquired to determine so-called fine shifts undergone between successive images.

15 Claims, 3 Drawing Sheets

U.S. PATENT DOCUMENTS

| | | | |
|---|---|---|---|
| 6,040,566 A | | 3/2000 | Rioland et al. |
| 6,307,959 B1* | | 10/2001 | Mandelbaum et al. ....... 382/154 |
| 7,095,876 B2* | | 8/2006 | Broekaert ..................... 382/107 |
| 7,548,256 B2* | | 6/2009 | Pilu ............................ 348/208.3 |
| 7,705,884 B2* | | 4/2010 | Pinto et al. ............... 348/208.99 |
| 2007/0258707 A1* | | 11/2007 | Raskar ............................ 396/52 |
| 2009/0190013 A1* | | 7/2009 | Hiraga et al. ................ 348/296 |

FOREIGN PATENT DOCUMENTS

| | | |
|---|---|---|
| FR | 2828315 A1 | 2/2003 |
| GB | 2407226 A | 4/2005 |
| WO | 01/04055 A2 | 1/2001 |

OTHER PUBLICATIONS

Nuno-Maganda M A et al: "Three Video Applications Using an FPGA Based Pyramid Implementation: Tracking, Mosaics and Stabilization" Field-Programmable Technology (FPT), 2003. Proceedings. 2003 IEEE International Conference on Dec. 15-17, 2003, Piscataway, NJ, USA, IEEE, pp. 336-339, XP010688359; ISBN: 0-7803-8320-6.

Dias J et al: "Vision and Inertial Sensor Cooperation Using Gravity As a Vertical Reference" IEEE Transactions on Pattern Analysis and Machine Intelligence, IEEE, New York, NY, US, vol. 25, No. 12, (Dec. 2003), pp. 1597-1608, XP011103927, ISSN: 0162-8828.

Vieville T et al: Autonomous Navigation of a Mobile Robot Using Inertial and Visual Cues: Intelligent Robots and Systems '93, IROS '93. Proceedings of the 1993 IEIEE/RSJ International Conference on Yokohama, Japan Jul. 26-30, 1993, New York, NY, USA, IEEE, US, vol. 1, pp. 360-367, XP010219090, ISBN: 0-7803-0823-9.

Luo et al: "A Tutorial on Multisensor Intergration and Fusion"; Robotics and Intelligent Systems Laboratory Department of Electrical and Computer Engineering; North Carolina State University; Raleigh, NC 27695-7906; Thales DLG. Downloaded on Dec. 3, 2006; pp. 707-722.

* cited by examiner

HYBRID IMAGE STABILIZATION METHOD AND APPARATUS

CROSS-REFERENCE TO RELATED APPLICATIONS

The present Application is based on International Application No. PCT/EP2007/056294, filed on Jun. 25, 2007, which in turn corresponds to French Application No. 06 05885 filed on Jun. 29, 2006, and priority is hereby claimed under 35 USC §119 based on these applications. Each of these applications are hereby incorporated by reference in their entirety into the present application.

FIELD OF THE INVENTION

The invention relates to the stabilization of an image sequence acquired by an observation device of an imaging system such as a video camera, subject to unintentional movements or vibrations. The observation device typically operates at wavelengths in the visible or infrared region.

BACKGROUND OF THE INVENTION

A first solution relates to the video cameras on board a terrestrial, naval or aerial platform which are in general mounted on an orientable mount, for example of the theodolite type, or else in a sighting instrument having a mirror with two orientable axes. Servocontrols ensure stabilization of the line of sight by utilizing the information from a gyroscope or from rate gyros secured to the camera.

Another solution concerns portable lightweight cameras of the camcorder or binocular type (intensified or infrared) which are oriented and stabilized manually by the observer but remain subject to the residual erratic movements of the latter. Solutions for stabilizing the line of sight of the camera are implemented by associating two gyrometric sensors secured to the casing of the camera with an opto-mechanical deviator component such as a variable-angle prism or lens off-centered by actuators included in the objective of the camera.

In these two cases, one speaks of "a priori" stabilization.

Other solutions call upon image processing for mutual registration of the successive images of a video sequence. In this case, one speaks of "a posteriori" electronic stabilization. An example of a posteriori stabilization is described in patent FR 2 828 315: low-frequency images are extracted from the images acquired and are used to determine by an optical flow procedure the translations and rotations to be applied to the images so as to stabilize them. "A posteriori" electronic stabilization procedures are not usable in the case of images exhibiting a uniform background structure or a repetitive texture (sky, forest or maritime surface for example).

SUMMARY OF THE INVENTION

The aim of the invention is to be able to use a low-cost image stabilization method operating whatever the content of the image (contrasted or not, structured or not, etc.).

The principle of the image stabilization method according to the invention is based on combining a priori stabilization and a posteriori stabilization.

More precisely, it involves using the information arising from at least one gyrometric sensor secured to the camera to calculate approximate shifts between the successive images (a priori stabilization) and then calculating fine shifts between these images by an image processing (a posteriori stabilization) which uses these approximate shifts as initialization.

The first approximate stabilization is obtained independently of the background and of the contrast of the objects in the images.

This first stabilization is obtained by determining the attitude of the camera.

More precisely, the subject of the invention is a method of stabilizing the images of a scene, acquired by means of an observation device of an imaging system, comprising a step of digital processing of a stream of successive images. It is chiefly characterized in that it comprises a step of acquiring gyrometric measurements by means of at least one gyrometric sensor secured to the observation device, of using these gyrometric measurements to determine so-called approximate shifts undergone between successive images, and in that the image processing step comprises a sub-step of using the approximate shifts and the image stream acquired to determine so-called fine shifts undergone between successive images.

The advantage of the hybrid motion estimation is thus to allow stabilization of the image sequence (of the image stream) whatever the scene.

Preferably, the image processing step comprises a sub-step of evaluating the fine shifts with a view to choosing between the approximate shifts and the fine shifts, those which have to be applied to the image stream so as to stabilize it.

According to a characteristic of the invention, the image processing step comprises a sub-step of temporal filtering of the shifts.

Advantageously, the step of determining the fine shifts comprises the steps consisting in:
a—dezooming the successive images k times to obtain k reduced-resolution image streams, k being an integer greater than or equal to 1,
b—calculating shifts on the basis of the kth reduced-resolution image stream and the approximate shifts,
c—as long as k is strictly greater than 1, iterating the following process:
calculating shifts on the basis of the (k−1)th reduced-resolution image stream and the preceding shifts,
k=k−1,
d—calculating the fine shifts on the basis of the preceding shifts and the original image stream.

The shift calculations are obtained for example by correlation.

The subject of the invention is also a device for stabilizing the images of a scene comprising an observation device of an imaging system and an element for digital processing of successive images, characterized in that it furthermore comprises at least one gyrometric sensor secured to the observation device and to the image processing element.

According to a characteristic of the invention, the image processing element comprises a microprocessor able to implement calculations of shift between successive images.

According to another characteristic of the invention, it comprises a first programmable logic array positioned between the observation device and the gyrometric sensor or sensors on the one hand and the image processing element on the other hand, this programmable logic array being able to acquire gyrometric measurements from the sensors and an image stream from the observation device and preferably another programmable logic array positioned at the output of the microprocessor and linked to the observation device and able to apply the shifts provided by the microprocessor to the image stream arising from the first programmable logic array.

According to a variant of the invention, these programmable logic arrays are grouped into a single programmable logic array.

These programmable logic arrays are preferably FPGAs.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

Across all the figures, the same elements are tagged by the same references.

DETAILED DESCRIPTION OF THE INVENTION

Figure 1:
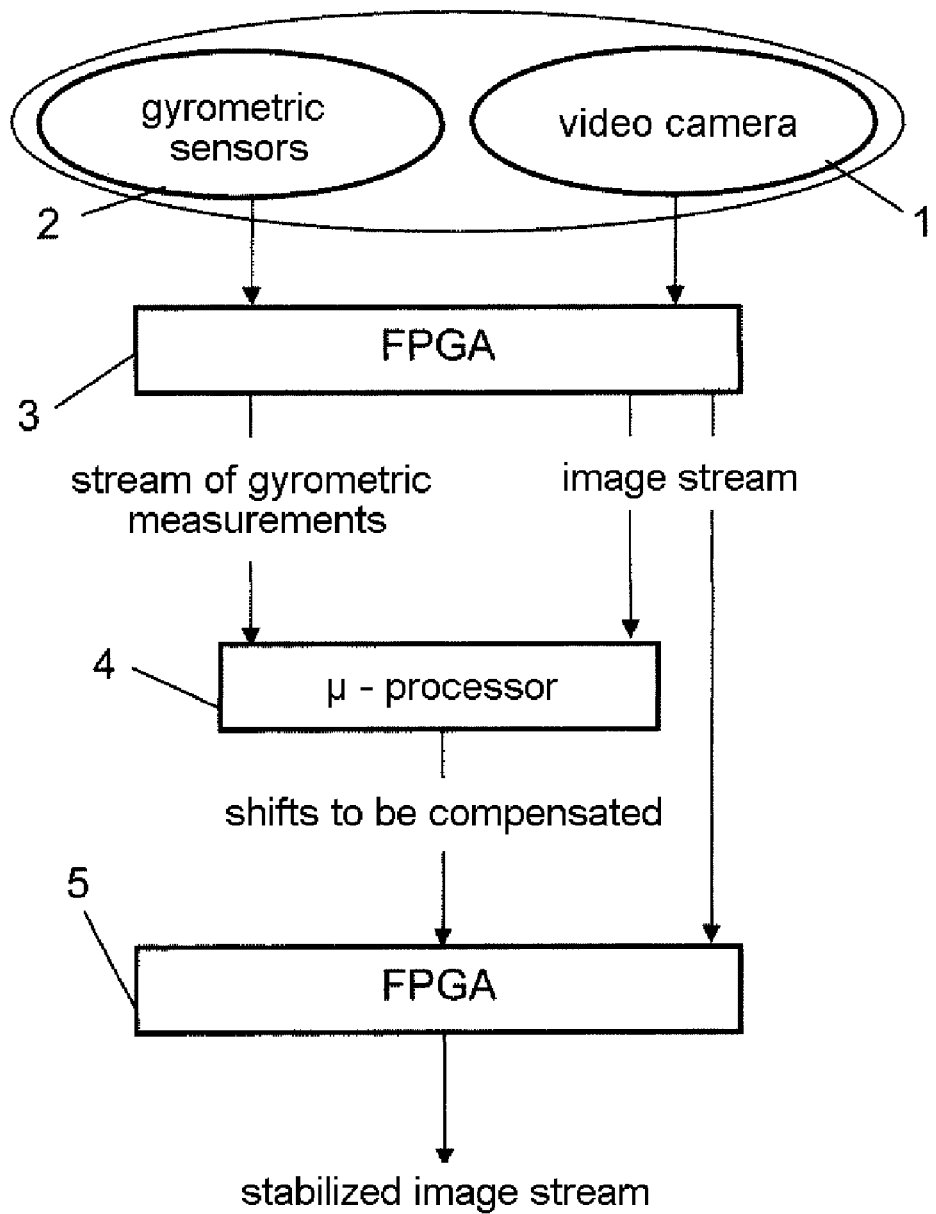
FIG. 1 schematically represents a stabilization device according to the invention, FIG. 2 schematically represents the various steps of the hybrid estimation of the method according to the invention, FIG. 3 schematically represents the various steps of the second level of registering of the hybrid estimation.

An exemplary stabilization device according to the invention is represented in FIG. 1.

It comprises a video camera 1 and two gyrometric sensors 2 secured to the camera. The image of the camera comprising pixels distributed in rows (x axis) and columns (y axis); there is preferably one sensor for the pixel rows and another for the columns. These sensors are typically MEMS (acronym of the expression "Micro Electro Mechanical System") embodied on silicon. They are linked to an FPGA 3 (acronym of the expression Field Programmable Gate Array). It is recalled that an FPGA is a user-programmable prediffused array of logic gates, used for a particular function. The FPGA delivers an image stream and a stream of gyrometric measurements; these streams are synchronized in such a way that the shift measured by the rate gyros is referred to the corresponding image.

These information streams are processed by a microprocessor 4. This processing of the streams of images and synchronized gyrometric measurements consists chiefly of a so-called hybrid motion estimation the aim of which is to provide an estimation of the spurious movements between successive images. More precisely, the microprocessor 4 calculates the shifts to be compensated so as to geometrically register the images with respect to one another. The object of the stabilization is to correct the unintentional movements of the camera in 3D space. Perfect correction is achieved by combining a rotation and translations along the three axes (x,y,z). Within the framework of correcting vibration movements of low amplitudes and high frequencies, a correction in terms of translation along the axes of the image (x and y axes) is sufficient.

At output, the microprocessor 4 provides the calculated shifts to another FPGA 5. This FPGA, the function of which is the geometric transformation of the image stream acquired, then produces a stream of stabilized images. According to a variant, a single FPGA is used to carry out the functions of the two FPGAs.

Figure 2:
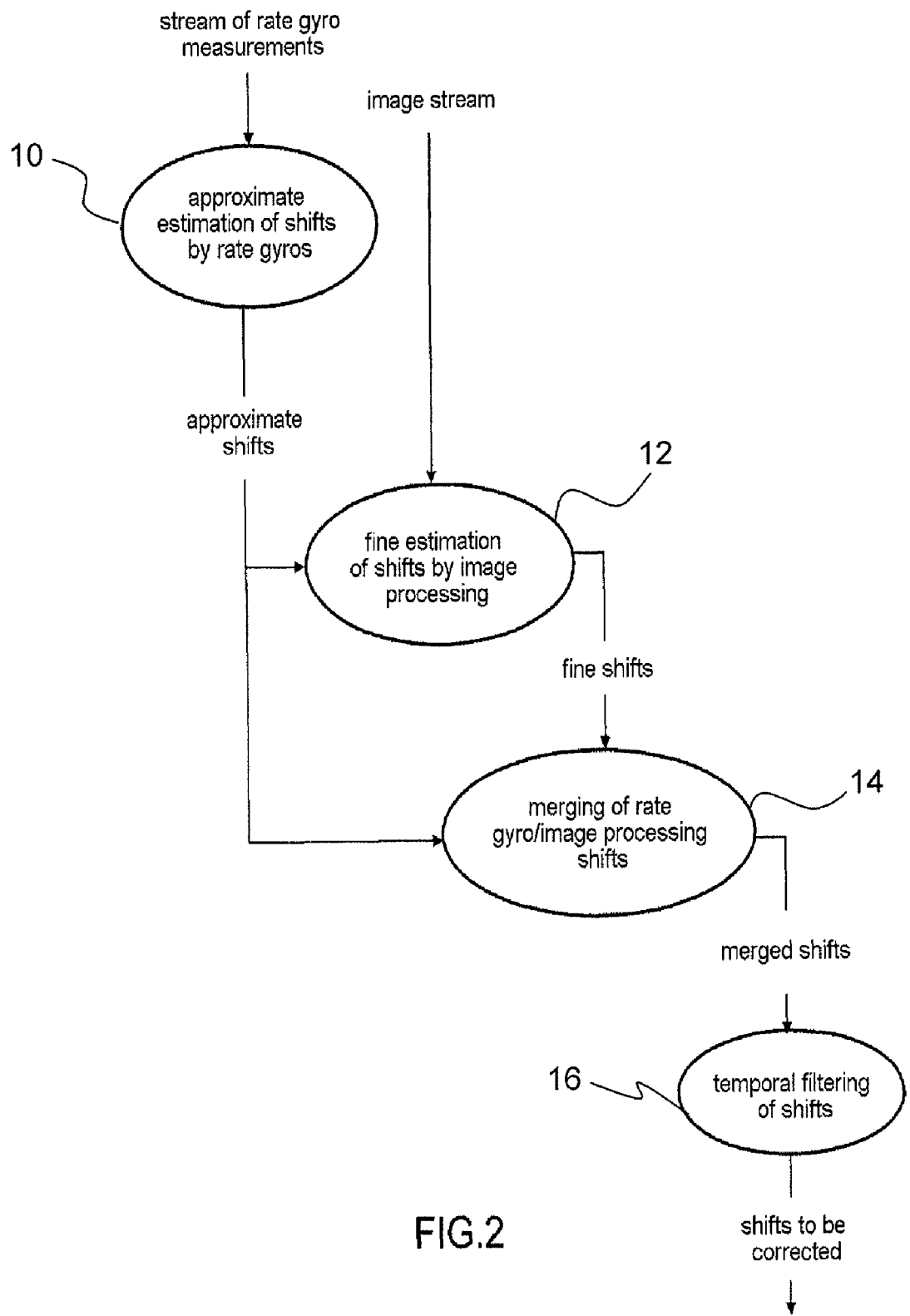

The various steps of the hybrid estimation that are carried out by the microprocessor 4 and illustrated in FIG. 2 are the following.

Approximate estimation (10) of the shifts by the gyrometric sensors. The stream of measurements arising from the gyrometric sensors possesses a greater frequency than the stream from the video camera. This gyrometric stream is filtered temporally so as to reduce the noise of the low-cost sensors, which is synchronized with respect to the acquisition of the images (i.e. a shift along the x axis and a shift along the y axis are associated with each image) and the angular values given by the rate gyros are converted into numbers of pixels as a function of the field of the camera. A so-called approximate shift is obtained, that is to say one with a precision of the order of 4 to 6 pixels for a field of about 4°, or of 2 to 3 pixels for a field of about 8°; it is intended to be utilized by the second level of registration (registration by image processing).

Fine estimation (12) of the shifts by image processing: the second level of registration, fine registration (with a precision of less than a pixel for example), is carried out by image processing, for example by correlating successive images pairwise. This second level uses the first level of registration to initialize its estimation, this initialization thus making it possible to save processing time and to enhance the reliability of measurement by imposing the consistency of the two estimations. This second level of registration is detailed further on.

This estimation of shifts can be seen as a hierarchical process producing a first approximate estimation by gyrometric measurements which is thereafter refined by image processing optionally several times, according to increasingly fine resolutions. This principle makes it possible notably to retain low calculational complexity for the process whereas a simple correlation would turn out to be very expensive.

Merging (14) of the estimations of shifts: the third step consists in merging the two preceding levels of shift so as to combine the precision of the estimation by image processing and the reliability of the gyrometric estimation. The aim here is to provide the best estimation of the movements as a function of context: fast or slow movements, of large or small amplitude, image content contrasted or not, structured or not, etc. For this purpose, the fine registration processing integrates an auto-evaluation method detailed further on and aimed at estimating the reliability of the processing, for example by monitoring the level or the local curvature of a correlation peak. According to the result of this auto-evaluation, one or the other of the registration levels is favored:

if the estimation by image processing is not sufficiently reliable because the image has little contrast, the scene exhibits an unsuitable structure such as mono-directional forms, the scene is unstructured, movements are too fast and/or of too large amplitudes, then the approximate level of registration is favored, if the estimation by image processing is reliable then the fine level of registration is favored.

The reliability is for example defined as a function of a minimum threshold on the correlation result and of a minimum threshold on the correlation gradient. The advantage of the hybrid motion estimation is thus to allow stabilization of the image sequence (of the image stream) whatever the scene.

Filtering (16) of the shifts: the last step is the temporal filtering of the various shifts measured over time, the aim of which is to separate the various components of the shift so as to eliminate the shifts which are caused by unintentional movements and preserve only those which result from intentional displacements of the line of sight such as those of a panning motion for example. The former correspond to the displacements of low amplitudes and of high temporal frequencies whereas the latter correspond to the displacements of large amplitudes and of low temporal frequencies.

The step of the second level of registration (fine registration) will now be described in greater detail in conjunction with FIG. 3. This figure illustrates an example of carrying out fine estimation of the shifts by image processing based on the principle of multi-resolution correlation:

The current image $I_t$ and the previous image $I_{t-i}$ are first of all dezoomed (20), that is to say undergo a step in which the resolution is decreased by a factor N.

a low-pass filtering of the image, a sub-sampling through which only one pixel is preserved out of N pixels along the two axes.

Many implementations are possible for carrying out such a dezoom. In our implementation, a dezoom by a factor 2 is carried out by simple averaging over 2×2 blocks i.e.:

$$I_D(i, j) = \frac{(I(2i, 2j) + I(2i+1, 2j) + I(2i, 2j+1) + I(2i+1, 2j+1))}{4}$$

denoting by:

I the full-resolution image ($I_t$ or $I_{t-1}$)

$I_D$ the dezoomed image ($I_{Dt}$ will denote the dezoomed image $I_t$ and $I_{Dt-1}$ the dezoomed image $I_{t-1}$)

i,j the row and column indices of the pixels in the image.

The dezoomed images $I_{Dt}$ and $I_{Dt-1}$ are thereafter correlated to provide a so-called under-resolved estimation of shift.

It is possible to apply several procedures to carry out the correlation. One such will now be described.

The correlation consumes a great deal of calculation power. This is why firstly, the correlation is carried out only on a "window" of reduced size and centered respectively in the images $I_{Dt}$ and $I_{Dt-1}$; these windows generally correspond to a zone of interest in the images.

Secondly, any function making it possible to quantify the similarity between a reference image $I_{Dt}$ and a secondary image $I_{Dt-1}$ is designated as correlation. For our implementation, we have chosen to use a distance function (i.e. dissimilarity function) of Minkowski metric type, but some other may be chosen:

$$d(I_{Dt}, I_{Dt-1}) = \left(\sum_{i=1}^{N}\sum_{j=1}^{M} |I_{Dt}(i, j) - I_{Dt-1}(i, j)|^p\right)^{1/p}$$

denoting by:

p the order of the distance, $I_{Dt}$ and $I_{Dt-1}$ the two images to be compared, i and j the row and column indices of the pixels in the image, N the number of rows of the image and M the number of columns.

In the implementation carried out, we limit ourselves to a metric of order 1 (p=1).

The principle of estimating the shift between two images is as follows.

The correlation surface or distance surface denoted Nd is constructed by displacing the correlation support for the reference image $I_{Dt}$ (the support is a window in the window of the reference image), over a given correlation horizon, in relation to the secondary image and by calculating, for each position, the Minkowski distance:

$$Nd(u, v) = \left(\sum_{i=1}^{N}\sum_{j=1}^{M} |S_{Dt}(i, j) - S_{Dt-1}(i+u, j+v)|^p\right)^{1/p}$$

for: $-H_y \leq u \leq H_y$ and $-H_x \leq v \leq H_x$ denoting by:

$S_{Dt}$ and $S_{Dt-1}$ the supports centered in the reference and secondary windows of sizes N×M, i and j the row and column indices in the support, u and v the row and column indices in the correlation surface, $H_x$ and $H_y$ the correlation horizons along x and y.

The indices u,v corresponding to the minimum over the distance surface give the estimated shift between the reference image $I_{Dt}$ and the secondary image $I_{Dt-1}$.

The correlation horizons Hx and Hy determine the maximum amplitude of the displacements that are estimatable by image processing. The smaller these horizons, the lower the calculation time and the more reliable the motion estimation since the probability of finding a local minimum of the correlation surface decreases (synonymous with poor estimation), on condition that the chosen horizons are greater than the actual displacements. Having an a priori idea (approximate estimation) of the inter-image shift makes it possible to pre-position the secondary correlation support and therefore to reduce the size of the search horizons.

The hierarchical process is as follows:

The rate gyros make it possible to obtain an approximate shift with a precision of the order of 4 to 6 pixels in a small camera field, obtained as the outcome of very low calculational complexity that is much smaller than that of an exhaustive correlation.

Thereafter, the low-resolution correlation (22), that is to say carried out on the dezoomed images (cf. FIG. 3), initialized by the estimation of the rate gyros and using horizons of the order of the precision of the rate gyros, makes it possible to obtain a precision of the order of 2 pixels.

Finally, the high-resolution correlation (24) carried out on the images $I_t$ and $I_{t-i}$ in place of $I_{Dt}$ and $I_{Dt-1}$, and by using as initialization the shifts obtained through the low-resolution estimation of a precision of the order of 2 pixels, makes it possible to obtain an estimation of fine shifts, that is to say a precision of the order of a pixel.

This process can be generalized in the following manner. Having obtained the approximate shifts, the following steps are carried out:

a—dezooming the successive images k times to obtain k reduced-resolution image streams, k being an integer greater than or equal to 1, b—calculating shifts on the basis of the kth reduced-resolution image stream and the approximate shifts, c—as long as k is strictly greater than 1, iterating the following process:

calculating shifts on the basis of the (k−1)th reduced-resolution image stream and the preceding shifts, k=k−1 d—calculating the fine shifts on the basis of the preceding shifts and the original image stream. To "dezoom" means to reduce the resolution.

Figure 3:
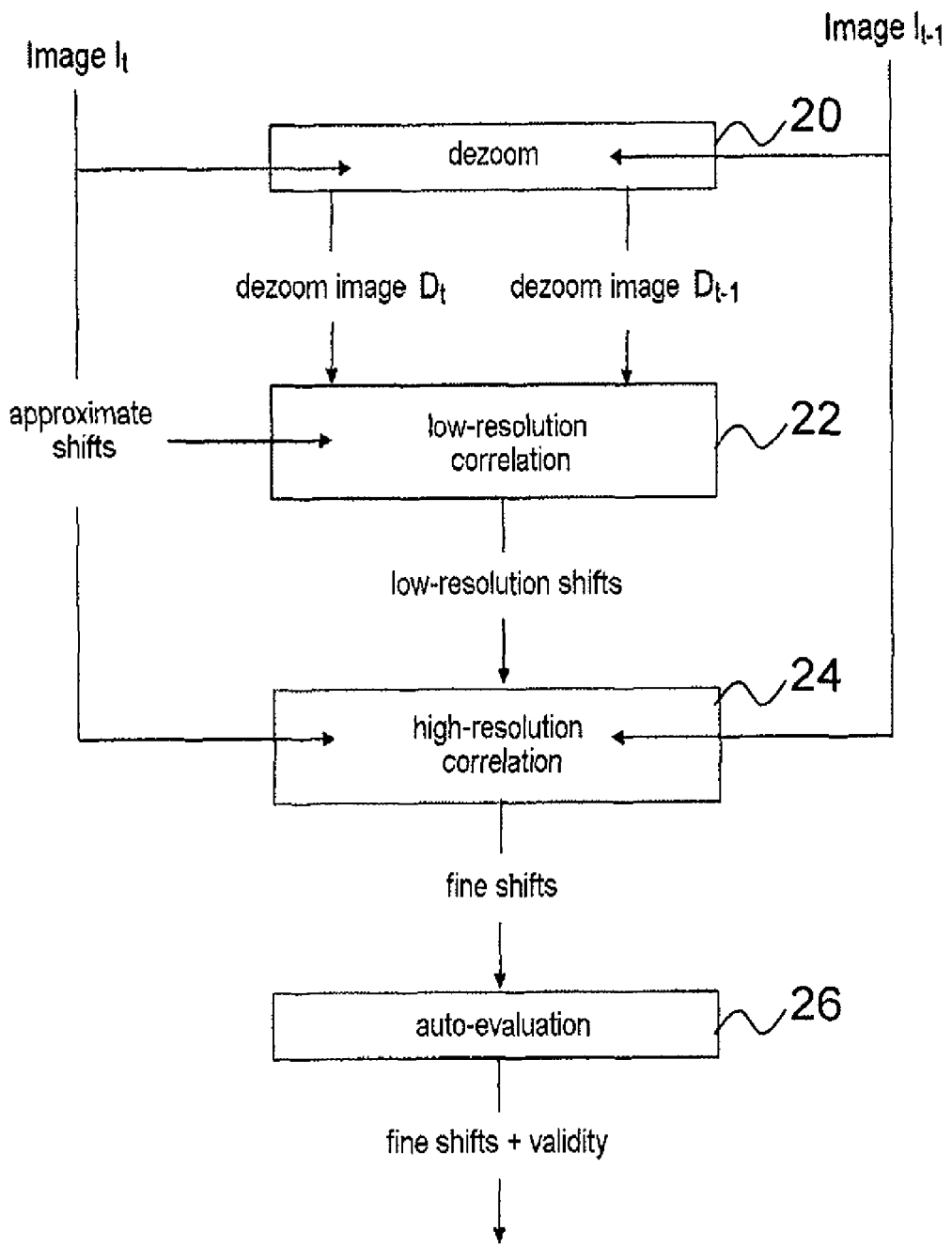

The example of FIG. 3 corresponds to k=1.

The hierarchical process therefore operates by successive refinements of the motion estimation and is beneficial in terms of calculation time (the low-resolution correlation being of lesser complexity than the high-resolution correlation) and in terms of reliability.

A last step of auto-evaluation (14 or 26) of the correlation quality makes it possible to determine the overall reliability of this process, which reliability is used during merging to take the decision as to whether or not to use this motion estimation by image processing.

The reliability of the motion estimation by image processing is estimated through the qualification of the correlation surface. This involves validating that the correlation peak (correlation maximum or distance minimum Lp) is sufficiently marked. Accordingly, the following information is used simultaneously:

height of the peak, for example by analyzing that the difference, in absolute value, between the height of the correlation peak and the average over the correlation surface is greater than a threshold, curvature on the peak, for example by analyzing for each of the x and y directions, that the difference in absolute value between the height of the correlation peak and the average of its two immediate neighbors is greater than a threshold.

If one of the above two criteria is not satisfied, the correlation is invalidated.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method for stabilizing images of a scene acquired by an observation device of an imaging system, the method comprising:
   a step for acquiring gyrometric measurements by at least one gyrometric sensor secured to the observation device;
   a step for performing an image processing of a stream of successive images, the step for performing the image processing comprising:
   determining approximate shifts undergone between the successive images by using the gyrometric measurements;
   determining fine shifts undergone between the successive images by using the approximate shifts and the image stream;
   evaluating the fine shifts, integrating an auto-evaluation method aimed at estimating reliability of the image processing;
   if the image processing is estimated not to be reliable, the approximate shifts are favored; and
   if the image processing is estimated to be reliable, the fine shifts are favored,
   a step for applying the favored shifts to the image stream so as to stabilize it.

2. The method as claimed in claim 1, wherein the step for performing the image processing further comprises temporally filtering the favored shifts.

3. The method as claimed in claim 2, wherein the determining of the fine shifts comprises the steps consisting of:
   a. dezooming the successive images k times to obtain k reduced-resolution image streams, k being an integer greater than or equal to 1,
   b. calculating shifts on the basis of a $k^{th}$ reduced-resolution image stream and the approximate shifts,
   c. as long as k is strictly greater than 1, iterating the following process:
      i. calculating shifts on the basis of a $(k-1)^{th}$ reduced-resolution image stream and the preceding shifts, and
      ii. k=k-1, and
   d. calculating the fine shifts on the basis of the preceding shifts and the original image stream.

4. The method as claimed in claim 3, wherein the shift calculations are obtained by correlation.

5. The method as claimed in claim 1, wherein the determining of the fine shifts comprises the steps consisting of:
   a. dezooming the successive images k times to obtain k reduced-resolution image streams, k being an integer greater than or equal to 1,
   b. calculating shifts on the basis of a $k^{th}$ reduced-resolution image stream and the approximate shifts,
   c. as long as k is strictly greater than 1, iterating the following process:
      i. calculating shifts on the basis of a $(k-1)^{th}$ reduced-resolution image stream and the preceding shifts, and
      ii. k=k-1, and
   d. calculating the fine shifts on the basis of the preceding shifts and the original image stream.

6. The method as claimed in claim 5, wherein k=1.

7. The method as claimed in claim 6, wherein the shift calculations are obtained by correlation.

8. The method as claimed in claim 5, wherein the shift calculations are obtained by correlation.

9. A device for stabilizing images of a scene, the device comprising:
   an observation device of an imaging system;
   an image processing element for performing an image processing of a stream of successive images;
   at least one gyrometric sensor secured to the observation device and linked to the image processing element, the at least one gyrometric sensor acquiring gyrometric measurements,
   wherein the image processing element comprises means for implementing a method, the method comprising:
   determining approximate shifts undergone between the successive images by using the gyrometric measurements;
   determining fine shifts undergone between the successive images by using the approximate shifts and the image stream;
   evaluating the fine shifts, integrating an auto-evaluation method aimed at estimating reliability of the image processing;
   if the image processing is estimated not to be reliable, the approximate shifts are favored, the favored shifts being applied to the image stream so as to stabilize it; and
   if the image processing is estimated to be reliable, the fine shifts are favored, the favored shifts being applied to the image stream so as to stabilize it.

10. The device as claimed in claim 9, further comprising:
    a first programmable logic array disposed between the observation device and the at least one gyrometric sensor on the one hand and the image processing element on the other hand, the first programmable logic array being able to acquire the gyrometric measurements from the at least one gyrometric sensor and the image stream from the observation device.

11. The device as claimed in claim 10, further comprising:
    a second programmable logic array disposed at an output of the image processing element and linked to the first programmable logic array, the second programmable logic array being able to apply the favored shifts to the image stream arising from the first programmable logic array.

12. The device as claimed in claim 11, wherein the second programmable logic array is an FPGA.

13. The device as claimed in claim 10, wherein the first programmable logic array is an FPGA.

14. The device as claimed in claim 9, further comprising:
a programmable logic array linked to the observation device and to the image processing element, the programmable logic array being able to acquire the gyrometric measurements from the at least one gyrometric sensor and to acquire the image stream from the observation device and being able to apply the favored shifts to said image stream.

15. The device as claimed in claim 14, wherein the programmable logic array is an FPGA.

* * * * *